Patented Aug. 26, 1952

2,608,525

UNITED STATES PATENT OFFICE 2,608,525

CATALYTIC CRACKING OF HYDROCARBONS WITH A SILICA-ALUMINA-ZIRCONIA COMPOSITE

Charles L. Thomas, Winnetka, Ill., assignor to Universal Oil Products Company, Chicago, Ill., a corporation of Delaware No Drawing. Original application November 17, 1941, Serial No. 419,431. Divided and this application January 11, 1946, Serial No. 640,679

4 Claims. (Cl. 196—52)

1

This application is a true division of my copending application, Serial No. 419,431, filed November 17, 1941, which in turn is a continuation-in-part of application, Serial No. 284,923, filed July 17, 1939, said prior applications being now abandoned.

This invention relates to the manufacture of catalysts suitable for accelerating reactions among hydrocarbons. More specifically, it has reference to a method of manufacturing refractory catalytic materials which are particularly effective in selectively promoting the formation of high antiknock motor fuel from relatively heavy petroleum fractions. The preferred catalysts are prepared synthetically by definite steps of procedure which are specific to the production of catalysts of high activity for prolonged use.

The present invention is concerned with the manufacture of catalytic materials which are specifically adapted to accelerate the cracking of heavy fractions of petroleum and other hydrocarbonaceous materials whereby motor fuel hydrocarbons are produced at milder conditions of temperature and pressure than those used in the pyrolytic cracking processes and with the formation of motor fuel of higher antiknock value. Gaseous products are concurrently produced containing high percentages of readily polymerizable olefins which are a potential source of further yields of motor fuel of comparable high antiknock value. These catalysts are characterized by their selectivity in accelerating motor fuel-forming reactions rather than light gas-forming reactions, by their porous and refractory condition which enables them to retain their catalytic properties under high temperature character of use and regeneration, by their ease and simplicity of manufacture and their exact reproducibility. The preferred catalysts comprise specially prepared composites such as, for example, silica-alumina, silica-zirconia, silica-alumina-thoria which have a relatively high degree of activity.

In one specific embodiment the present invention comprises a process for the manufacture of catalysts suitable for use in hydrocarbon conversion reactions by precipitating a hydrated silica gel by the acidification of an alkali metal silicate solution, partially washing the silica gel, suspending the partially washed silica gel in a solution of an aluminum and/or zirconium salt, precipitating hydrated aluminum and/or zirconium oxide gels from the solution, partially washing the suspended gel materials, filtering and drying the washed materials until they can be readily comminuted and finally washing the comminuted materials to substantially complete removal of alkali metal ions after which the finally washed material may be dried and formed into particles of definite dimensions which are calcined at temperatures of from about 1000° to 1500° F.

The above briefly outlined procedure has been found to be particularly efficient in the production of silica-alumina and/or zirconia catalysts due to the fact that the alkali metal ions are substantially completely removed with a minimum of washing difficulties. The silica and the composited silica-alumina and/or zirconia are first partly washed in the gel condition to remove what is usually a major amount of the contaminating alkali metal ions by methods of percolation and final washing of a filter cake or the washing may be done entirely by percolation with the mechanical filtering only operating to remove a major portion of the adhering water. The precipitated gels may have a water content as high as 95% and are bulky and hard to handle. However, it is possible to remove a considerable amount of the alkali metal ions by washing by percolation prior to filtering. After the primary washing of the silica gel and the silica-alumina and/or zirconia composites they are dried at temperatures of from about 150 to 350° F. to a water content of from about 15 to about 30% at which point they are readily ground to 30–60 mesh materials for the final washing.

It is within the scope of the present invention to employ several types of washing in the different washing stages. For example, aqueous solutions of mineral acids such as hydrochloric and sulphuric acids may be employed; solutions of ammonium salts which act to replace alkali metals with ammonium which is later removed by calcining; and solutions of multivalent metal salts including salts of aluminum and zirconium and other multivalent metals which replace the alkali metals and exert a beneficial action on the catalytic activity of the finally prepared material. When washing the mixed silica-alumina and/or zirconia gels or the finally dried composite with acids, limited and controlled amounts must obviously be used to avoid redissolving the alumina and/or zirconia. When washing with ammonium compounds any excesses will be calcined out in the final steps of catalyst manufacture and when using any aluminum or multivalent metal salts excesses may be used and left on the composites.

The character and efficiency of the catalysts ultimately prepared according to the present procedure will vary with the exact conditions of precipitation and mixing of the essential ingredients, the particular washing method employed at different stages and the ratios of the oxides of aluminum and/or zirconium to the silica. As a rule, the best catalysts contain major proportions of precipitated silica and minor proportions of alumina and/or zirconia. Catalysts having 5 to 15% of aluminum and/or zirconium oxides and 95–85% of silica usually give best results when used as catalysts in cracking hydrocarbons. However, there are instances where higher ratios of the aluminum and/or zirconium oxides have given good results.

According to a preferred method of preparation, a silica gel is first prepared by acidifying an aqueous solution of sodium silicate by mixing with an acid such as hydrochloric acid. The manner in which the gel formation is brought about and the concentration of the solution and excess acid used are carefully regulated in order that a suitable silica hydrogel is formed for subsequent purification and compositing with alumina and/or zirconia. In general, suitable silica hydrogel may be produced by the use of moderately dilute solutions of sodium silicate and mixing with a regulated excess of acid whereby the desired active silica gel is obtained and conditions of filtering and handling are at an optimum.

Then, in accordance with the present invention, the hydrated silica gel, after breaking up and washing with regulated amounts of water, is suspended in a solution of a salt of aluminum and/or zirconium, such as aluminum chloride, for example, in the desired proportion and hydrogels of alumina and/or zirconia are deposited upon the suspended silica gel by a volatile alkaline precipitant, such as ammonium hydroxide, ammonium carbonate, ammonium sulfides, etc. Alternatively, although not with equivalent results, the hydrated silica gel may be mixed while in the wet condition with separately precipitated alumina and/or zirconia hydrogels.

At this point the mixture of gels may be further washed in a gel condition by any of the prescribed methods, although washing at this point is optional. The gels are collected on a filter and dried to a water content of from about 15 to about 30%. The dried material is then subjected to a final washing treatment for the substantially complete removal of alkali metal ions. It appears that if any appreciable amounts of alkali metal ions are left in the finally prepared catalyst composites, a sintering or fusion of their surfaces occurs at elevated temperatures so that their porosity is much reduced with a corresponding reduction in effective catalyst surface.

When treating either the gels or the partially washed and dried materials with dilute acids, as for example with hydrochloric acid, the acid removes the alkali metal impurities present in the material. The salts formed and any excess of acids are then substantially removed by water washing treatment. Where ammonium compounds or salts of multivalent metals are used, the ammonium or multivalent metals used apparently displace the alkali metal impurities present in the composite and the alkali metal salts formed together with the major portion of the purifying reagent are removed in succeeding water washing treatment.

The finally washed material is preferably dried at a temperature of from about 240 to about 300° F., after which it may be formed into particles of a suitable average size, ranging from powder to various formed sizes obtained by pressing and pelleting or other methods. Alternatively the final washing may be applied after the catalytic material has been formed. By calcining the substantially alkali-metal ion free material at temperatures of from about 1000 to about 1500° F., maximum activity of the catalyst is obtained for its prolonged use, and a further dehydration occurs, the water content as determined by analysis being of the order of from about 2 to about 3% which is firmly fixed and does not vary appreciably even after long service.

Catalysts prepared by the general procedure described in the preceding paragraphs may be utilized in tubes or chambers in hydrocarbon conversion reactions. The general procedure in cracking for example involves contacting the heated hydrocarbonaceous material with the catalyst and subsequent separation steps involving separation of overhead products from residuum and/or insufficiently converted hydrocarbons which may be returned to contact with the catalyst for further conversion treatment, the fractionated products being further separated into motor fuel of the desired gasoline boiling point range and normally gaseous fractions which may be subjected to polymerizing treatment to convert readily polymerizable olefins present in the gases into additional yields of the desired high antiknock motor fuel.

The following example of the preparation and use of catalysts characteristic of the present invention is given to indicate their novelty and utility although not for the purpose of limiting the invention in exact agreement with the data introduced.

In the preparation of the catalyst, 165 pounds of commercial water glass containing 8.9 per cent $Na_2O$ and 28.5 per cent $SiO_2$ was pumped into a tank and diluted to 150 gallons. Concentrated hydrochloric acid which had been diluted with an equal volume of water was gradually added to the diluted sodium silicate while agitating the solution. The addition of acid was continued until the pH of the solution was approximately 8.5. Upon continued agitation for about 15 minutes the silica sol had gelled for the greater part whereupon a small excess of acid was added bringing the pH to approximately 4.5. The excess acid was then neutralized whereby substantially complete gelation of the desired silica gel was obtained. The gel was washed with water in order to remove the larger portion of alkali metal ions whereupon it was collected on a filter and slurried in approximately 110 gallons of water containing 15 pounds of aluminum chloride. Ammonium hydroxide solution made by adding 1 volume of water to 1 volume of concentrated reagent was added while agitating until the solution was slightly alkaline whereby alumina hydrogel was precipitated in the presence of the suspended silica hydrogel. The composited material was then charged to a filter and the collected material was dried at approximately 250° F. The dried material was then charged into a tank containing about 40 gallons of water and violently agitated in order to break up the dried cake and uniformly suspend the material. A solution of 3 pounds of aluminum chloride in 2 gallons of water was then added and the agitation continued for about ½ hour, after which the suspended material was collected on a filter and washed thoroughly with water in the filter press. The solid material was then dried at a temperature of approximately 250° F. and then calcined at approximately 1500° F. for one hour.

The catalyst prepared as above was disposed in vertical tubes and a Mid-Continent distillate of 28.7° A. P. I. gravity was processed in a once-through operation. The average temperature used was approximately 948° F. with an inlet pressure of approximately 28 pounds per square inch. The liquid hourly space velocity was 1.1 and a yield of 45.4 per cent of 81.2 octane number was obtained. The residual oil was satisfactory for recycle stock and an additional 7 per cent by volume of the charging stock of gasoline of the same octane number was obtainable from propene and butenes present in the uncondensed gases.

I claim as my invention:

1. Process of producing gasoline from ordinarily liquid hydrocarbon fractions comprising cracking such fractions in the presence of a catalyst prepared by calcination at temperature of at least 700° F. of a composite of silica, alumina and zirconia obtained by subjecting a zeolite to mild treatment with acid and freeing the same of alkali metal, said zeolite having been obtained by the drying of a mixture of hydrous oxides and alkali metal cation.

2. Process for producing gasoline from ordinarily liquid hydrocarbon fractions comprising cracking such fractions in the presence of a catalyst prepared by drying a mixture of hydrous oxides of silicon, aluminum and zirconium containing alkali metal ions, subjecting the dried mixture to treatment with acid and freeing the same of alkali metal, and calcining the thus treated mixture at a temperature of at least 700° F.

3. Process of producing gasoline from ordinarily liquid hydrocarbon fractions comprising cracking such fractions in the presence of a catalyst prepared by calcination at temperature of at least 700° F. of a composite comprising silica and alumina obtained by subjecting a zeolite to mild treatment with acid and freeing the same of alkali metal, said zeolite having been obtained by the drying of a mixture of hydrous oxides and alkali metal cation.

4. Process for producing gasoline from ordinarily liquid hydrocarbon fractions comprising cracking such fractions in the presence of a catalyst prepared by drying a mixture comprising hydrous oxides of silicon and aluminum containing alkali metal ions, subjecting the dried mixture to treatment with acid and freeing the same of alkali metal, and calcining the thus treated mixture at a temperature of at least 700° F.

CHARLES L. THOMAS.

REFERENCES CITED

The following references are of record in the file of this patent:

UNITED STATES PATENTS

| Number | Name | Date |
|---|---|---|
| 2,212,035 | Morrell et al. | Aug. 20, 1940 |
| 2,232,727 | Peterkin et al. | Feb. 25, 1941 |
| 2,283,172 | Bates | May 19, 1942 |
| 2,375,756 | Bates | May 15, 1945 |